United States Patent
Brüls

(10) Patent No.: US 6,535,252 B1
(45) Date of Patent: Mar. 18, 2003

(54) DEVICE FOR RECEIVING DISPLAYING AND SIMULTANEOUSLY RECORDING TELEVISION IMAGES VIA BUFFER

(75) Inventor: Wilhelmus H. A. Brüls, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/179,283

(22) Filed: Oct. 27, 1998

(30) Foreign Application Priority Data

Oct. 29, 1997 (EP) .............................. 97202565

(51) Int. Cl.$^7$ .......................... H04N 11/20; H04N 5/44; H04N 5/46

(52) U.S. Cl. ..................... 348/459; 348/553; 348/554; 348/555; 348/556; 348/441; 348/497

(58) Field of Search ........................... 348/441, 458, 348/459, 497, 907, 554–556, 558; 725/22; 345/154, 155; 375/372; 386/45, 131, 125, 126; H04N 7/01, 7/00, 9/79, 5/781, 5/91

(56) References Cited

U.S. PATENT DOCUMENTS

| | | | | |
|---|---|---|---|---|
| 4,602,297 A | * | 7/1986 | Reese ........................ | 360/14.1 |
| 4,752,834 A | * | 6/1988 | Koombes .................... | 358/335 |
| 5,023,718 A | * | 6/1991 | Soloff ......................... | 358/160 |
| 5,220,425 A | * | 6/1993 | Enari et al. ................. | 358/160 |
| 5,293,232 A | * | 3/1994 | Seki et al. .................. | 358/715 |
| 5,325,179 A | * | 6/1994 | Azar et al. .................. | 348/443 |
| 5,333,091 A | * | 7/1994 | Iggulden et al. ............ | 360/14.1 |
| 5,371,551 A | | 12/1994 | Logan et al. ............... | 348/571 |
| 5,452,010 A | * | 9/1995 | Doornink .................... | 348/497 |
| 5,555,463 A | * | 9/1996 | Staron ........................ | 348/560 |
| 5,692,093 A | * | 11/1997 | Iggulden et al. ............. | 386/46 |
| 5,696,866 A | * | 12/1997 | Iggulden et al. ............. | 386/46 |
| 5,949,441 A | * | 9/1999 | Ristau ......................... | 345/509 |
| 5,986,692 A | * | 11/1999 | Logan et al. ................. | 348/13 |
| 5,987,210 A | * | 11/1999 | Iggulden et al. ............. | 386/46 |
| 5,999,689 A | * | 12/1999 | Iggulden ..................... | 386/46 |
| 6,002,443 A | * | 12/1999 | Iggulden ..................... | 348/553 |
| 6,014,126 A | * | 1/2000 | Nishihara ................... | 345/132 |
| 6,088,455 A | * | 7/2000 | Logan et al. ............... | 380/200 |
| 6,137,943 A | * | 10/2000 | Kanda ........................ | 386/46 |
| 6,169,842 B1 | * | 1/2001 | Pijnenburg et al. ........... | 386/46 |
| 6,177,922 B1 | * | 1/2001 | Schiefer et al. ............. | 345/132 |

FOREIGN PATENT DOCUMENTS

| | | |
|---|---|---|
| EP | 0365764 B1 | 7/1990 |
| WO | 9416442 A1 | 7/1994 |

* cited by examiner

Primary Examiner—John Miller
Assistant Examiner—Paulos M. Natnael
(74) Attorney, Agent, or Firm—Laurie E. Gathman

(57) ABSTRACT

A device for receiving, storing and displaying television images. The device comprises a buffer (2) for storing television images. Television images having a first frame frequency are received at an input (4). Television images having a second frame frequency are supplied at an output (6). The buffer is adapted to store and read television images. A number of X consecutive television images stored in the buffer lie between a television image read at a given instant from the buffer and a television image stored at substantially the same instant. In a first state, X increases with time. In a second state, X decreases with time. The device further comprises a control device (12) for generating a first control signal (14) for bringing the device from the first to the second state, and a second control signal (16) for bringing the device from the second to the first state. This device makes it possible to start to watch television images simultaneously at the instant of their reception, while television images received at a later instant and not yet displayed, for example, a block of commercials, can be watched in an accelerated manner.

22 Claims, 3 Drawing Sheets

DEVICE FOR RECEIVING DISPLAYING AND SIMULTANEOUSLY RECORDING TELEVISION IMAGES VIA BUFFER

BACKGROUND OF THE INVENTION

This invention relates to a device for receiving and displaying television images comprising buffer means for storing television images. The invention also relates to a television apparatus provided with such a device.

A device of the type described in the opening paragraph is known from EP-B-0 375 764. The known device is intended for rapidly skipping commercials. If a user wants to watch a television program in such a way that he can skip the commercials in the television program, a number of minutes of the television program corresponding approximately to the expected total period of time of the commercials must first be stored in the buffer means. Subsequently, the device can be switched to a combined recording and display state at which the television images are read at the "normal" rate so that the user can only then watch the television program. When the user watches a commercial during display, he can switch the device to a state at which the television images are read from the buffer means in an accelerated way. At the end of the commercials, the user can again switch the device to the previously mentioned combined recording and display state. By watching the commercials in an accelerated way, the period of time of an interruption in a program comprising commercials will be reduced.

SUMMARY OF THE INVENTION

It is an object of the invention to provide a device having a more user-friendly facility of rapidly skipping the commercials in a television program.

To this end, the device according to the invention is characterized in that the buffer means are adapted to receive television images at a first frame frequency and to supply television images at a second frame frequency, a quantity X being defined as being X equal to the number of consecutive television images, stored in the buffer means, between an image read from the buffer means at a given instant and an image written at substantially the same instant, in that X increases with time in the first state and decreases with time in the second state, and in that the device comprises control means for generating a first control signal for bringing the device from the first to the second state, and a second control signal for bringing the device from the second to the first state.

The invention provides a device in which it is no longer necessary to store a number of minutes of the television program corresponding to the period of time of the commercials to be expected in the television program into the buffer means and subsequently start watching the television program. The invention provides the possibility of watching these commercials simultaneously with the reception of the beginning of the television program. To be able to skip the expected commercials rapidly, a slightly larger number of television images are stored in the buffer means per unit of time in a first state as compared with the number of television images read, so that at the instant when a block of commercials in a program is displayed and watched by the user, this block is approximately entirely stored in the buffer means. The user can now switch the device to a second state so that the block of commercials is skipped in an accelerated way. In order that the user can continue watching the program, he will then switch the device to the first state again.

The device according to the invention has the extra advantage that the buffer means may be smaller because it need only be approximately the size of one inserted block of commercials.

A first embodiment of the device according to the invention is characterized in that the buffer means are adapted to store television images received at the input of the buffer means at the first frame frequency and to read television images stored in the buffer means at the second frame frequency and supply said images at the output, wherein the first frame frequency is larger than the second frame frequency, the buffer means, in the first state, being adapted as a FIFO and, in the second state, being adapted to supply each time N television images of successive groups of M consecutive television images stored in the buffer means at the output of said buffer means, N and M being positive integers and chosen to be such that X decreases with time. In this embodiment, the value of the first frame frequency at the input of the buffer means in the first state is equal to the value of the first frame frequency in the second state. The values of the second frame frequency at the output of the buffer means are equal to each other in the first and the second state. This has the advantage that the device does not need to be further adapted as far as possible pre-processing and post-processing means for switching from the first to the second state, or vice versa, are concerned. In the first state, all received television images are displayed at the output in the same order. In the second state, a part of the received television images is displayed at the output of the buffer means. Normally, the first frame frequency will be 25 Hz. This means that, in this embodiment, the display tube connected to the output must be capable of displaying television images at the lower, second frame frequency which is, for example 22 Hz.

A second embodiment of the device according to the invention is characterized in that the buffer means are of the FIFO type and are adapted to store television images received at the input of the buffer means at the first frame frequency, and to read television images stored in the buffer means at the second frame frequency and supply them at the output, the second frame frequency in the first state being smaller than the first frame frequency, and the second frame frequency in the second state being larger than the first frame frequency. In this embodiment, all received and stored television images are supplied at the output of the buffer means in the first and the second state. In this embodiment, the frame frequency at the output of the buffer means is, for example, 25 Hz in the first state and, for example, 100 Hz in the second state. In this embodiment, the image-processing means in the device subsequent to the buffer means should be capable of processing television images at both frame frequencies.

A third embodiment of the device according to the invention is characterized in that the buffer means are adapted to receive and supply television images at the first frame frequency at their input and output, respectively, said buffer means, in the first state, being adapted to supply each received television image at least once and a part of the received television images more than once at the output of said buffer means. In this embodiment, the frame frequencies at the input and output of the buffer means are equal and do not differ in the first and the second state. This has the advantage that the device in accordance with the third embodiment can be used in a standard television apparatus in which no costly adaptations are necessary. In the first state, all received television images are displayed at the output once or several times in the same sequence. The television images can be stored in, or read from the buffer means several times and supplied from the output. In the second state, a part of the received and stored television images is displayed at the output of the buffer means.

Further embodiments and advantages of the device according to the invention are described in the dependent claims.

BRIEF DESCRIPTION OF THE DRAWINGS

These and other aspects of the invention are apparent from and will be elucidated with reference to the embodiments described hereinafter.

In the drawings.

DETAILED DESCRIPTION OF THE PREFERRED EMBODIMENTS

Figure 1:
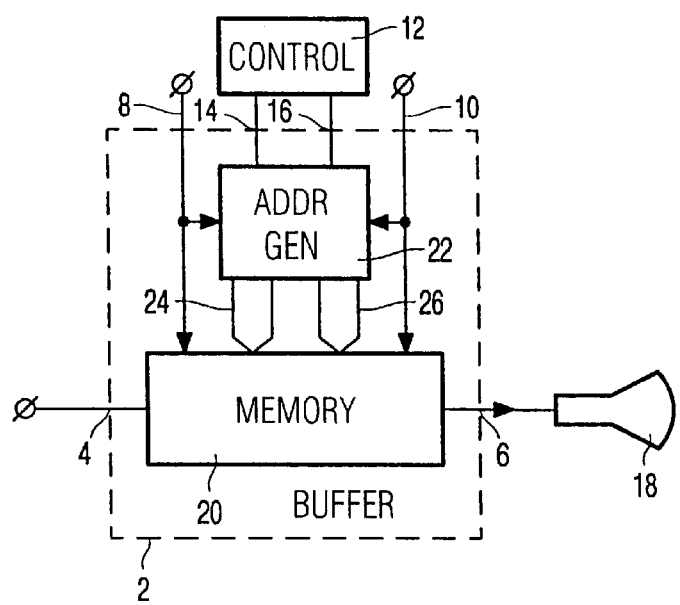
FIG. 1 is a block diagram of a first embodiment of the device according to the invention.

FIG. 1 is a block diagram of a first embodiment of a device according to the invention. The device comprises buffer means 2 for storing television images, an input 4 for receiving television images and storing these images at a first frame frequency $f_1$, and an output 6 for supplying television images at a second frame frequency $f_2$. For storing the television images at the first frame frequency, a first clock signal corresponding to this frequency is applied to a "load" clock input via a terminal 8. For reading the television images at the second frame frequency, a second clock signal corresponding to this frequency is applied to a "read" clock input via a terminal 10. The first clock signal may be derived from, for example, the incoming television images. The second clock signal is generated by a clock generator (not shown). Control means 12 are provided for generating a first control signal 14 which brings the buffer means 2 from a first to a second state, and a second control signal 16 which brings the buffer means from the second to the first state. The output 6 of the device is coupled to a display unit 18 for visualizing the television images.

The buffer 2 has a memory 20 for storing television images, with an input coupled to the input 4 of the buffer 2 and an output coupled to the output 6 of the buffer. Moreover, the buffer 2 comprises an address generator 22 which is adapted to generate a first address signal 24 and a second address signal 26, both of which are applied to the memory 20.

The memory 20 is divided into locations. Each location may comprise a television image and has its own address. The television images are received at the input 4 of the buffer 2. A television image at the input is clocked by means of the first clock signal 8 and subsequently stored at the location indicated by the first address signal 24. When the frequency of the received television images is equal to the first frame frequency of, for example, 25 Hz, each television image will be stored once in the memory 20. However, if the first frame frequency is larger than the frequency of the received television images, then there are television images which are stored more than once in the memory 20. By means of the second clock signal 10, a television image which is stored at the location indicated by the second address signal 26 is read from the memory 20 and applied to the output 6 of the buffer 2. The memory 20 preferably consists of a magnetic disc or a semiconductor memory.

In a first embodiment, the address generator 22 comprises a first and a second address register. The first address register supplies the first address signal 24, and the second address register supplies the second address signal 26. The address registers are adapted to address the memory 20 cyclically so that an address register which would comprise a value outside the range of the memory 20 would get the value corresponding to the location at the beginning of the memory 20. When the device is switched on, the address registers get an equal value which corresponds to, for example, the first location in the memory 20. At each clock pulse of the first clock signal 8, the first address register gets the value which corresponds to the next location in the memory 20. At each clock pulse of the second clock signal 10, the second address register gets the value which corresponds to the next location in the memory 20. Since, in the first state, the first frame frequency of, for example, 25 Hz is larger than the second frame frequency of, for example, 22 Hz, the first address register will address the locations in the memory 20 more rapidly than the second address register. It has been found that the delayed readout and display of television images, at which a ratio of 25:X is used for the first and the second frame frequency, with X being in the range between 20 and 25, is not experienced as a disturbance. The number of locations, hence the number of stored television images in the memory 20 between the location indicated by the first address signal 24 and the location indicated by the second address signal 26, will increase with time in this state. Since, in the second state, the second frame frequency is larger than the first frame frequency of, for example, 100 Hz, the second address register will address consecutive locations in the memory 20 more rapidly than the first address register. The number of television images stored in the memory 20 between the location indicated by the first address signal 24 and the second address signal 26 will decrease with time in this state. When in this embodiment the first frame frequency is larger than the frame frequency at which television images are received at the input of the device, for example, 28 Hz with respect to 25 Hz, a number of television images will be stored at two locations in the buffer. If the second frame frequency in the first state is substantially equal to the frame frequency of the television images at the input of the device, then the number of locations in the memory 20 between the location indicated by the first address signal 24 and the location indicated by the second address signal 26 will also increase with time in this state. In a device provided with this embodiment of the address generator 22, a coupled display unit 18 should be capable of processing the supplied television images at the low, second frame frequency of, for example, 22 Hz in the first state as well as at the high, second frame frequency of, for example, 100 Hz in the second state.

In a second embodiment of the address generator 22, this generator operates in the first state similarly as in the first embodiment. In the second state, the second address register skips a number of locations in the memory 20 at each clock pulse of the second clock signal 10, such that each time N locations of M consecutive locations in the memory 20 are addressed. In this case, N and M are positive integers and chosen to be such that the number of television images stored in the buffer means decreases with time between a television image stored at a given instant and a television image read at substantially the same instant, while the frequency of the second clock signal 10 and hence the number of television images per second applied to the output 6 remains equal to that in the first state.

In a third embodiment of the address generator 22, this generator differs from the first or second embodiment in that, in the first state, the second address register does not get the value corresponding to the next location in the memory 20 at each clock pulse of the second clock signal 10, but that the same value remains present in the address register at one or more clock pulses. For example, at 25 clock pulses, the second address register gets only 22 different values of consecutive locations in the memory 20. When the first clock signal is then substantially equal to the second clock signal, this embodiment results in a number of stored television images being supplied twice, with the effect that the television program in the first state is displayed in a slightly delayed manner, and the number of locations in the memory 20 between the location indicated by the first address signal 24 and the location indicated by the second address signal 26 increases with time.

Figure 2:
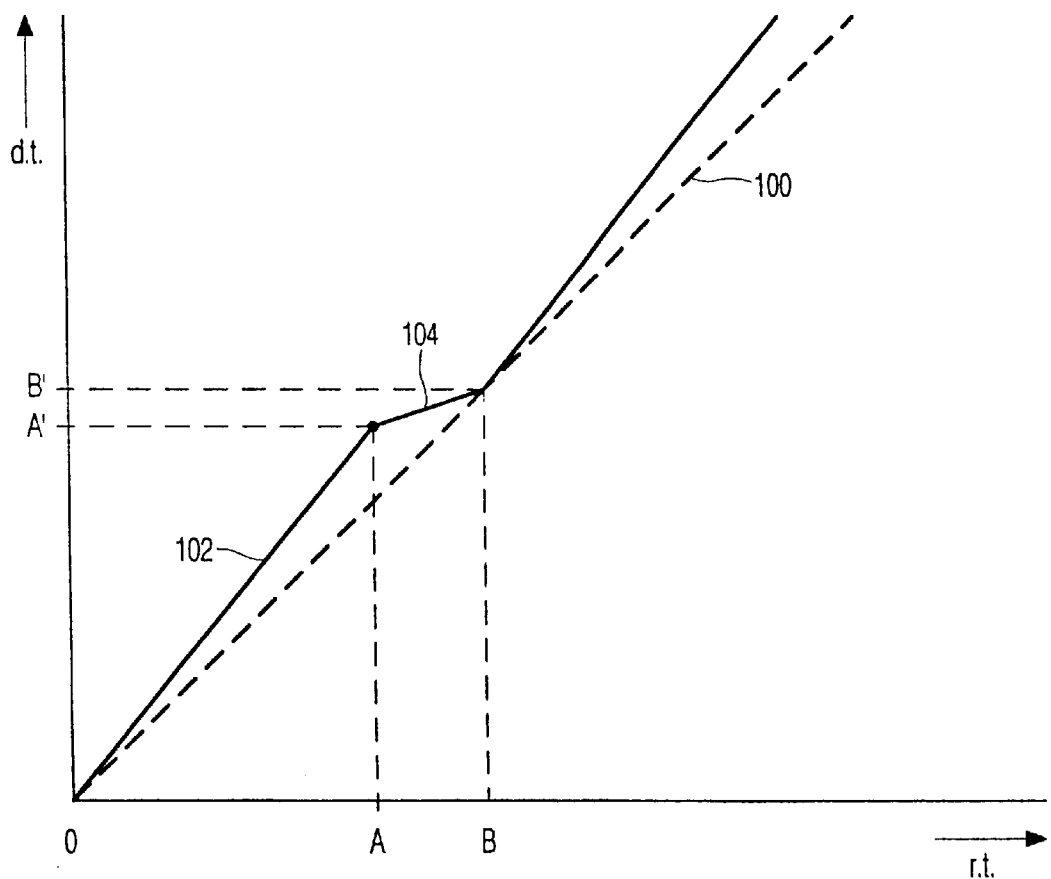
FIG. 2 shows a graph in which the reception time is plotted versus the supply time of television images when using a device according to the invention.

FIG. 2 shows the relation between the instant of receiving a television image and displaying the same television image in accordance with the invention. The time of receiving r.t. is along the horizontal axis. The time of displaying d.t. is along the vertical axis. The straight line 100 is obtained when the instant of reception is equal to the instant of display. According to the invention, the received television images are increasingly delayed with time in the first state. At the instant 0, the device is in the first state. The relation between the time of receiving and displaying television images in the first state is denoted by the line section 102. The time between receiving and displaying a television image increases with time. At the instant A, the beginning of a block of commercials is received and stored in the buffer 2. The user will see this beginning at the later instant A'. The user then switches the device to the second state. When he sees the end of the block of commercials B', he will switch the device to the first state again. The graph shows the ideal situation in which the instant of reception of the end of a block of commercials approximately corresponds to the instant of display by the device. The relation between the time of receiving and displaying television images in the second state is denoted by the line section 104.

Figure 3:
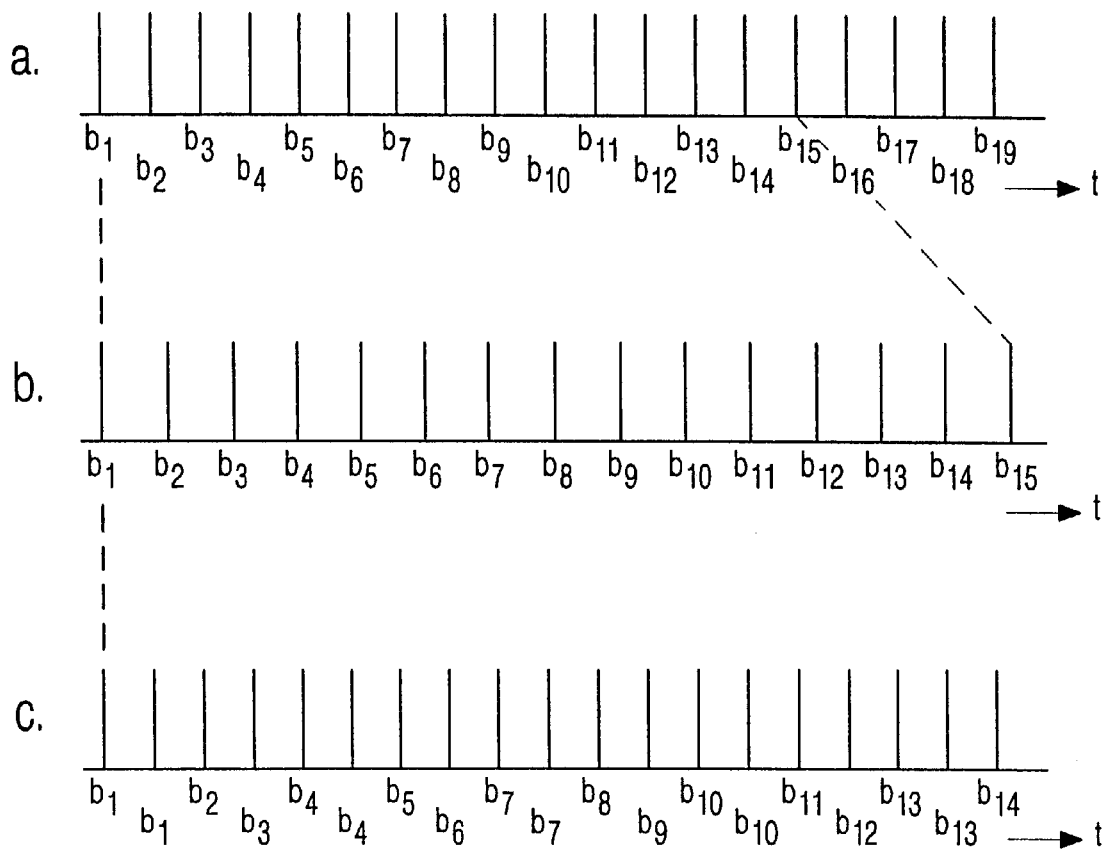
FIG. 3 shows diagrammatically the instants of recording and supplying television images with respect to time in the first state according to the invention.

FIG. 3 shows diagrammatically, as a function of time, the instants of receiving television images at the input and their supply at the output, with the device being in the first state. FIG. 3a shows diagrammatically, as a function of time, the instants of receiving the television images at the input 4 of the buffer 2. FIG. 3b shows diagrammatically, as a function of time, the instants of supplying the television images at the output 6 of the buffer 2. The buffer 2 comprises a first or a second embodiment of the address generator 22. The scale on the time axis is equal in FIGS. 3a and 3b. A television image $b_1$ is the first image received at the input 4 and is directly applied to the output 6. A subsequent television image $b_2$ is received $t_1$ seconds later, in which $t_1=1/f_1$. Television image $b_2$ is applied $t_2$ seconds after television image $b_1$ to the output 6, at which $t_2=1/f_2$. The time with which the received image $b_2$ is applied later to the output 6 by the buffer substantially corresponds to $t_2-t_1$. The time difference between the reception of a television image $b_p$ which is present P−1 television images after the television image $b_1$ at the input 4, and the supply of television image $b_p$ at the output 6 substantially corresponds to (P−1)×($t_2-t_1$) seconds. In the first state of the buffer 2, the time delay of the television images increases linearly with the number of received television images. FIG. 3c shows diagrammatically, as a function of time, the instants of supplying the television images at the output 6 of the buffer 2. The buffer 2 comprises an address generator 22 in accordance with the third embodiment. The number of television images supplied per second at the output 6 is substantially equal to the number of television images received at the input 4. The buffer 2 is adapted to repeat the supply of the first television image at the output 6 each time from a group of 3 television images received at the input 4. In FIG. 3c, the images b1, b4, b7, b10 and b13 are thus applied to the output 6 twice.

Figure 4:
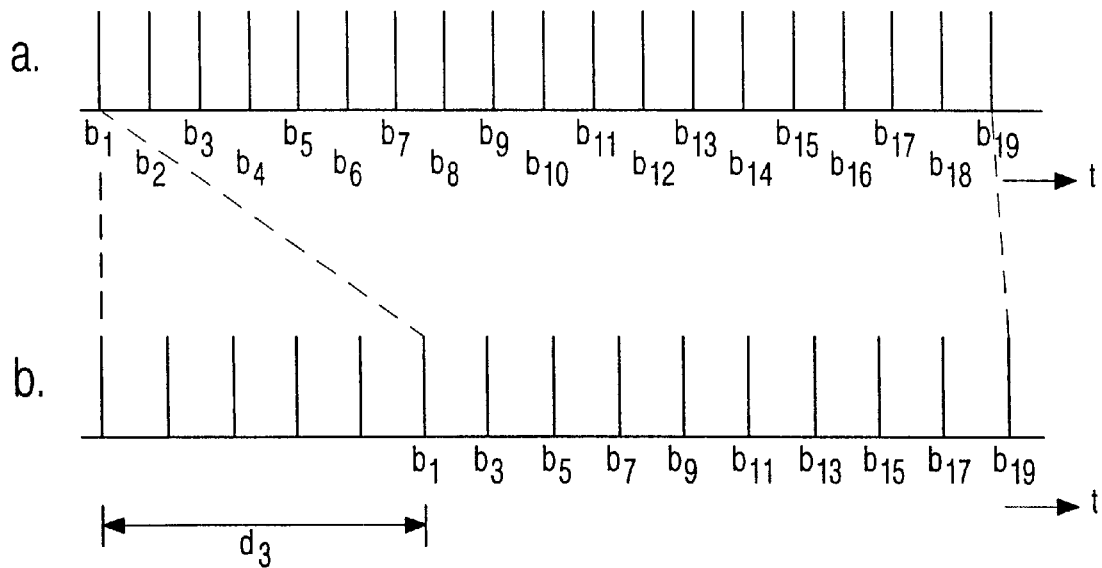
FIG. 4 shows diagrammatically the instants of recording and supplying television images with respect to time in the second state according to the invention.

FIG. 4 shows diagrammatically, as a function of time, the instants of receiving television images at the input and their supply at the output, at which the device is in the second state and comprises an address generator 22 as described in the second embodiment. FIG. 4a shows diagrammatically, as a function of time, the instants of receiving the television images at the input 4 of the buffer 2. FIG. 4b shows diagrammatically, as a function of time, the instants of supplying the television images at the output 6 of the buffer 2. In this example, the first television image of each consecutive group consisting of 2 television images is applied each time to the output 6 of the buffer 2. A television image $b_1$ is received at the input 4 and applied to the output 6 with a delay of $d_3$. A television image $b_3$ is received $2 \times t_1$ seconds later at the input 4 of the buffer 2, in which $t_1=1/f_1$. The television image $b_3$ is applied to the output 6 $t_2$ seconds after television image $b_1$, in which $t_2=1/f_2$. The time with which the received image $b_3$ is applied later to the output 6 by the buffer substantially corresponds to $d_3-(2 \times t_1-t_2)$ seconds. The time delay of $b_3$ with respect to $b_1$ decreases by $2 \times t_1-t_2$ seconds. The time difference between the reception of a television image $b_p$ received P−1 television images after the television image $b_1$ at the input 4, in which P is an odd number, and its supply to the output 6 substantially corresponds to $d_3-\frac{1}{2} \times (p-1) \times (2 \times t_1-t_2)$ seconds. The time delay in the second state of the buffer decreases linearly with the number of received television images.

The decrease of the time delay when N television images of consecutive groups of M television images are each time applied to the output substantially corresponds for each M received television image to $M \times t_1 - N \times t_2$ seconds. FIG. 4 shows an example in which M=2 and N=1.

Figure 5:
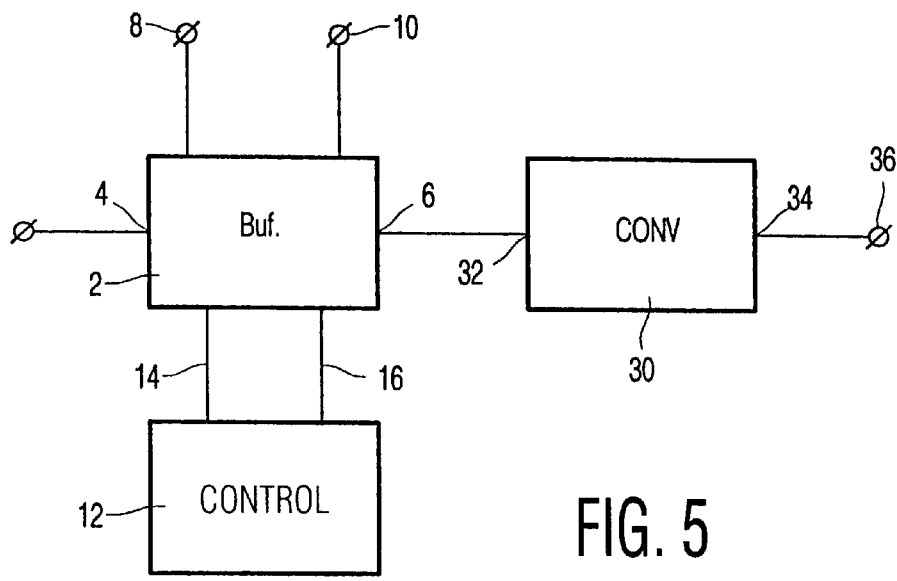
FIG. 5 is a block diagram of a second embodiment of the device according to the invention, provided with conversion means.

FIG. 5 is a block diagram of a second embodiment of the device according to the invention, provided with conversion means. The device comprises a buffer 2 for storing television images, and has an input 4 for receiving television images and storing them at a first frame frequency $f_1$, and an output 6 for supplying television images at a second frame frequency $f_2$. For storing the television images at the first frame frequency, a first clock signal, which corresponds to this frequency, is applied to a "load" clock input of the buffer 2 via a terminal 8. For reading the television images at the second frame frequency, a second clock signal, which corresponds to the second frame frequency, is applied to a "read" clock input of the buffer 2 via a terminal 10. The control means 12 are provided to generate a first control signal 14 which brings the buffer 2 from a first to a second state, and a second control signal 16 which brings the buffer 2 from the second to the first state. Conversion means 30 are provided and have an input 32 which is coupled to an output 6 of the buffer means 2 and an output 34 which is coupled to an output 36 of the device. The conversion means 30 are included to render the frame frequency of the television images at the output 36 of the device substantially equal to the frame frequency at the input 4 of this device, namely 25 Hz, so that a standard television can be connected. To this end, the conversion means 30 are adapted to convert television images at a third frame frequency $f_3$, received at the input 32, into television images at a fourth frame frequency $f_4$ for supply to the output 34. Since the output 6 of the buffer 2 is coupled to the input 32 of the conversion means 30, the second frame frequency $f_2$ and the third frame frequency $f_3$ are equal. If the frame frequency at the input 4 of the device and the fourth frame frequency $f_4$ are substantially equal, namely 25 Hz, the device can be easily used in a standard television apparatus (not shown). At a first frame frequency of 25 Hz at the input 4 of the buffer means 2, and with the device in the first state, the second frame frequency at the output 6 of the buffer means 2 and, coupled thereto, the third frame frequency at the input 32 of the conversion means 30 will be lower, for example, 22 Hz, whereas the third frame frequency at the output 34 of the conversion means 30 is 25 Hz again. Consequently, more images are applied to the output 34 of the conversion means 30 than are received at the input 32 of the conversion means 30.

In a first embodiment of the conversion means 30, all television images received at the input 32 are applied at least once to the output 34, and a part of the received television images is applied to the output more than once. Thus, by supplying three television images twice of, for example, the 22 television images received every second at the input 32, 25 television images can be applied every second to the output 34.

A second embodiment of the conversion means 30 is adapted to determine an intermediate television image between two consecutive television images by means of interpolation techniques or motion estimation techniques. By applying both the received television images and the intermediate television images obtained by means of interpolation or motion estimation to the output 34, the fourth frame frequency at the output 34 is higher than the third frame frequency at the input 32.

Figure 6:
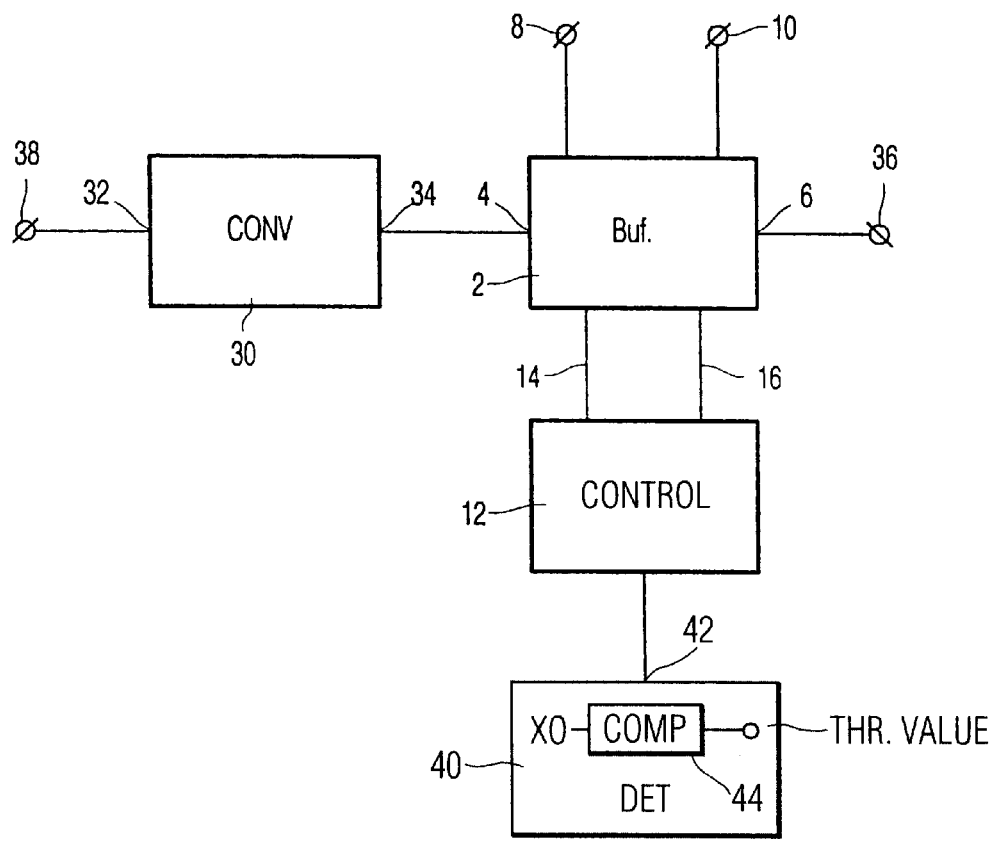
FIG. 6 is a block diagram of a third embodiment of the device according to the invention, provided with detection means.

FIG. 6 is a block diagram of a third embodiment of the device according to the invention, provided with conversion means 30 and detection means 40. In the third embodiment, the sequence of conversion means 30 and buffer means 2 is interchanged with respect to the second embodiment shown in FIG. 5. Similarly as in the second embodiment, the conversion means 30 has for its object to render the frame frequency at the output 36 of the device substantially equal to the frame frequency of the television images at the input of this device. Thus, when, for example, 25 television images per second are applied to the input 32, the conversion means 30 will apply, for example, 28 television images per second to its output 34 and to the input 4 of the buffer 2. In the first state of the device, the television images at 25 Hz will be read from the buffer 2 and applied to the output 36 of the device. As compared with the embodiment shown in FIG. 5, more television images per unit of time are stored in the buffer 2. For storing a block of commercials in the buffer 2, the buffer in FIG. 6 will have to be larger than the buffer 2 in FIG. 5. The sequence of, first, conversion means 30 and then the buffer 2 in FIG. 6 is advantageous when use is made of compression techniques, for example, MPEG. These techniques already determined compressed television images by means of interpolation between received television images. By causing the decoder to compute more television images between two television images than is normally necessary in accordance with the standard, these extra images can be generated in a simple manner. In this case, the decoder has the function of a compressor and converter. For adding the conversion function to the decoder, a relatively small number of extra hardware is required as compared with the separate conversion function. The compressed television images from the conversion means 30 are now stored in the buffer 2 at the first frame frequency. The compressed images are applied at the second frame frequency to the output 6 of the buffer 2 and to a standard decompression means (not shown in FIG. 6). The compressor and the decompression means are preferably implemented in accordance with one of the available video encoder/decoder (codec) chip sets supporting preferably the H.261 video communication standard or the multimedia standards MPEG and JPEG.

It is to be noted that, in all mentioned embodiments, the device is adapted, in the first state during display of the television images, to reproduce the associated sound "lip"-synchronously.

The control means 12 shown in the block diagram of FIG. 1, 5 or 6 may be control means 12 to be operated by a user. In a first embodiment, the control means have one input means. It may be implemented as keys on a remote control unit or a keyboard. When the input means is used for the first time, the control means will generate the first control signal 14. When the input means is used a second time, the control means will generate the second control signal 16. At the subsequent use of the input means, the first and the second control signal will be cyclically generated by the control means. In a second embodiment, the control means have a first and a second input means. The input means may be implemented as keys on a remote control unit or a keyboard. Under the influence of the first input means, the first control signal 14 is generated by the control means 12 and, under the influence of the second input means, the second control signal 16 is generated by the control means 12.

The relation between the instant of receiving a television image and its display in accordance with the invention has been described hereinbefore with reference to FIG. 2. This Figure shows the ideal situation at which the instant B of receiving the last television image of a block of commercials is substantially equal to the instant B' of displaying this last television image. The parameter X is equal to the number of consecutive television images, stored in the buffer means, between an image read at a given instant from the buffer means and an image written substantially at the same instant. In said ideal situation, the user brings the device from the second to the first state at the instant when the value of X is equal to zero. To bring the device automatically from the second to the first state, the device is provided with detection means 40. In a first embodiment, the detection means are adapted to determine the value of X and have an output 42 which is coupled to the control means 12. When the value of X comes below a predetermined threshold value of, for example 1, the second control signal 16 is generated by the control means. Consequently, the device is brought from the second to the first state. The value of X and the previously determined threshold value can be compared in a comparison means 44 located either in the detection means 40 or in the control means 12.

In a second embodiment, the detection means 40 are also adapted to detect the class of television images, for example, commercials, and to generate a first, second and third detection signal in dependence upon the detected class of television images. The first detection signal is generated when the detected class corresponds to a standard class or to a class specified by the user, such as commercials. The second detection signal is generated when the detected class does not correspond to the standard class or to the user-specified class. The third detection signal is generated when the detected class corresponds to a standard class or to a user-specified class and the value of X comes below a predetermined threshold value of, for example 1.

A first detection method of determining the class of television images makes use of the classification codes transmitted along with the television images, such as PDC codes. A second detection method makes use of codes which are transmitted simultaneously with the television images, but through a different transmission channel. A third detection method makes use of the absence or presence of one or more characteristic features of consecutive television images such as, for example a logo. Other detection methods based on one or more features of consecutive television images are mentioned in WO 94/16442.

The control means 12 are adapted to determine when a television image received at the input 38 of the device is applied to the output 36 of this device. This may be effected by adding a feature to the television image, for example, a time code, when it is stored in the buffer means 2, and by detecting this feature at the output 6 of the buffer 2. In another method, a value which is dependent on the first and the second detection signal and the value of the first address register of the buffer are stored in a first (not shown) and a second register (not shown), respectively, in the control means 12 at the instant when a selected television image is stored in the buffer 2. The contents of the second address register of the buffer 2 are subsequently compared with the contents of the second register in the control means 12. At the instant when the value of the second address register of the buffer corresponds to the value of the second register in the control means 12, the selected television image is read from the buffer 2 and applied to the output 6. At this instant, the device can be brought to the first or the second state, dependent on the value of the first register or the associated first or second detection signal. Moreover, the control means 12 are adapted to generate a third control signal and a fourth control signal (not shown). Under the influence of the third control signal, the device is brought from the second state to a third state. Under the influence of the fourth control signal, the device is brought from the third state to the first state. In the third state, the buffer 2 is adapted to write television images and supply them in such a way that the number of television images stored in the buffer means between a television image stored at a given instant and a television image read at substantially the same instant remains equal with respect to time, for example 0.

The following steps are performed when a program is interrupted by, for example, a block of commercials. The detection means 40 detect that the television images at the input 4 of the buffer 2 correspond to the class of commercials and generate the first detection signal. Under the influence of the first detection signal, the first television image of a block of commercials is selected or marked. The device can thereby determine when the first television image is applied to the output 6 of the buffer 2. At the instant when the first television image of a block of commercials is applied to the output 6, the first control signal 14 is generated. The buffer 2 is now brought from the first to the second state. When the end of a block of commercials, or in other words, the continuation of the program is detected, the second detection signal is generated. Under the influence of the second detection signal, the last television image of the block of commercials is selected or marked. At the instant when the last television image of the block of commercials is applied to the output 6, the second control signal is generated. The buffer 2 is now brought from the second to the first state. The same actions are repeated for a subsequent block of commercials. In this embodiment of the device, the block of commercials is watched in an accelerated manner. For example, at the instant when the first television image is applied to the output 6, an entire block of commercials can be skipped by loading the second address register in the address generator 22 with the location which is associated with the television image after the last television image of a block of commercials.

At the instant when the device is in the second state and the value of X is smaller than a predetermined threshold value of, for example 0, the detection means 40 generate the third detection signal. Under the influence of this third control signal, the control means 12 now bring the buffer 2 from the second to the third state. The part of the commercial block which is subsequently received is now supplied at approximately the same instant. After the commercial block has finished, the detection means 40 will generate the fourth detection signal, so that the control means 12 will bring the buffer 2 from the third to the first state. As of that instant, the number of television images stored in the buffer 2 will increase with time again and at least a part of the next block of commercials can be displayed in an accelerated manner.

The sequence of buffer means 2 and conversion means 30 is used by way of example in FIG. 6 and may be changed. The detection means 40 may also be used in combination with all embodiments mentioned hereinbefore.

The device may also comprise comparison means determining whether the value of X is larger than a second predetermined threshold value which is equal to, for example the maximum number of television images which the buffer 2 can comprise. The comparison means may be part of the control means 12 or the detection means 40. When the value of X is larger than the second predetermined threshold value, the device is brought from the first state to the third state. Consequently, television images which have not been read from the buffer 2, will never be overwritten by television images received at the input 4. The user will switch the device from the third to the second state as soon as, for example a block of commercials is displayed. Consequently, the value of X will become smaller again than the second predetermined threshold value. Normally, the user will switch the device from the second state to the first state after the block of commercials. If the user should not do this, the device will be automatically switched from the second to the first state when X is smaller than the first threshold value.

If the detection means 40 in the device is adapted to detect the class of television images, and if the device is in the third state, it will automatically be switched from the third to the second state at the instant when, for example a block of commercials is shown. After the block of comercials has been read from the buffer, the device will be switched from the second state to the first state.

What is claimed is:
1. A device for receiving and displaying television images, comprising:
buffer means for storing television images, characterized in that the buffer means are adapted to receive televi- sion images at a first frame frequency and to supply television images at a second frame frequency, a quantity X equal to the number of consecutive television images being stored in the buffer means between an image read from the buffer means at a given instant and an image written at substantially the same instant, in that X increases with time in a first state of the device and decreases with time in a second state thereof, and the device comprises control means for generating a first control signal for bringing the device from the first to the second state, and a second control signal for bringing the device from the second to the first state, and further comprising conversion means having an input and an output and adapted to convert television images at a third frame frequency applied to its input into television images at a fourth frame frequency for supply to the output, the fourth frame frequency in the first state being substantially equal to the first frame frequency, and the second frame frequency being substantially equal to the third frame frequency.

2. A device as claimed in claim 1, characterized in that the buffer means are adapted to store television images received at an input of the buffer means at the first frame frequency and to read television images stored in the buffer means at the second frame frequency and supply said images at an output of the buffer means, wherein the first frame frequency is larger than the second frame frequency, the buffer means, in the first state, being adapted as a FIFO type and, in the second state, being adapted to supply each time N television images of successive groups of M consecutive television images stored in the buffer means at the output of said buffer means, N and M being positive integers and chosen such that X decreases with time.

3. A device as claimed in claim 2, which further comprises conversion means having an input and an output and adapted to convert television images at a third frame frequency applied to its input into television images at a fourth frame frequency for supply to the output, the fourth frame frequency in the first state being substantially equal to the first frame frequency, and the second frame frequency being substantially equal to the third frame frequency.

4. A device as claimed in claim 2 wherein the first frame frequency at the input of the buffer means is the same in the first state and second state of the device, and the second frame frequency at the output of the buffer means is the same in the first state and second state of the device.

5. A device as claimed in claim 1, characterized in that the buffer means are of the FIFO type and are adapted to store television images received at an input of the buffer means at the first frame frequency and to read television images stored in the buffer means at the second frame frequency and supply said images at an output, the second frame frequency in the first state being smaller than the first frame frequency, and the second frame frequency in the second state being larger than the first frame frequency.

6. A device as claimed in claim 5, which further comprises conversion means having an input and an output and adapted to convert television images at a third frame frequency applied to its input into television images at a fourth frame frequency for supply to the output, the fourth frame frequency in the first state being substantially equal to the first frame frequency, and the second frame frequency being substantially equal to the third frame frequency.

7. A device as claimed in claim 1, characterized in that the buffer means are adapted to receive and supply television images at the first frame frequency at its input and output, respectively, said buffer means, in the first state, being adapted to supply each received television image at least once and a part of the received television images more than once at the output of said buffer means.

8. A device as claimed in claim 1, wherein an output of the buffer means is coupled to the input of the conversion means.

9. A device as claimed in claim 1, wherein the output of the conversion means is coupled to an input of the buffer means.

10. A device as claimed in claim 1, characterized in that the buffer means comprise one of a magnetic disc memory and a semiconductor memory.

11. A device as claimed in claim 1, characterized in that the control means are adapted to be operated manually by a user.

12. A device as claimed in claim 1, characterized in that the device comprises detection means for detecting a class of the received television images, and has an output coupled to an input of the control means, said control means being adapted to generate the first or the second control signal dependent upon the class of the received television images.

13. A device as claimed in claim 12, characterized in that the class of the received television images corresponds to commercials, and in that the control means are adapted to generate the first and the second control signal under the influence of the detection of said class.

14. A device as claimed in claim 12, characterized in that the device comprises comparison means for comparing the value of X with a predetermined threshold value, in that the detection means are further adapted to determine the value of X, in that the control means are also adapted to generate a third control signal for bringing the device from the second state to a third state as soon as X is smaller than the predetermined threshold value, and in that the control means are further adapted to generate a fourth control signal for bringing the device from the third to the first state dependent upon the class of the received television images, the buffer means in the third state being adapted to write and supply television images such that X remains equal with respect to time.

15. A device as claimed in claim 1, characterized in that the device comprises detection means for determining the value of X and comparison means for comparing the value of X with a predetermined threshold value, and in that the control means are adapted to generate the second control signal as soon as the value of X is smaller than the predetermined threshold value.

16. A device as claimed in claim 1, characterized in that the device comprises detection means for determining the value of X and comparison means for comparing the value of X with a predetermined threshold value, in that the control means are also adapted to generate a third control signal for bringing the device from the first state to a third state as soon as X is larger than the predetermined threshold value, and a fourth control signal for bringing the device from the third state to the second state, the buffer means in the third state being adapted to write and supply television images, such that X remains equal with respect to time.

17. A device as claimed in claim 1 further comprising means for receiving and displaying television images coupled to an output of the buffer means.

18. A device for receiving and displaying television images comprising:

a storage device for television images and having an input to receive television images at a first frame frequency and an output to supply television images at a second frame frequency, address means coupled to the storage device so that a quantity X of consecutive TV images is stored in the storage device between an image read from the storage device at a given instant and an image written at substantially the same instant, and X increases with time in a first state of the device and decreases with time in a second state thereof, and control means for generating a first control signal for bringing the device from the first state to the second state, and a second control signal for bringing the device from the second to the first state;

wherein the address means comprises first and second address generators which generate first and second address signals for the storage device, wherein the first address signal defines the storage locations of the television images received at its input and the second address generator defines storage locations based upon the quantity X, and means for applying to the storage device first and second clock signals corresponding to the first and second frame frequencies, respectively.

19. A device as claimed in claim 18 wherein the first frame frequency is higher than the second frame frequency in the first state of the device and in the second state of the device the second frame frequency is higher than the first frame frequency.

20. A device as claimed in claim 18 wherein the first frame frequency at the input of the storage device is the same in the first state and second state of the device, and the second frame frequency at the output of the storage device is the same in the first state and second state of the device.

21. A device as claimed in claim 18 wherein the first frame frequency is greater than the second frame frequency.

22. A device as claimed in claim 18 wherein the second frame frequency in the first state is lower than the first frame frequency and the second frame frequency in the second state is higher than the first frame frequency.

* * * * *